(12) United States Patent
Hansen et al.

(10) Patent No.: US 12,000,325 B2
(45) Date of Patent: Jun. 4, 2024

(54) COOLANT SYSTEM FOR AN ENGINE

(71) Applicant: CNH Industrial America LLC, New Holland, PA (US)

(72) Inventors: Marc Hansen, New Holland, PA (US); Daniel Morey, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/877,065

(22) Filed: Jul. 29, 2022

(65) Prior Publication Data
US 2024/0035411 A1 Feb. 1, 2024

(51) Int. Cl.
*F01P 11/02* (2006.01)
*F01N 3/20* (2006.01)
*F01P 3/12* (2006.01)

(52) U.S. Cl.
CPC .......... *F01P 11/028* (2013.01); *F01N 3/2066* (2013.01); *F01P 3/12* (2013.01); *F01N 2260/024* (2013.01); *F01N 2590/08* (2013.01); *F01N 2610/11* (2013.01); *F01N 2610/1453* (2013.01)

(58) Field of Classification Search
CPC ......... F01P 11/028; F01P 3/12; F01N 3/2066; F01N 2260/024; F01N 2590/08; F01N 2610/11; F01N 2610/1453
See application file for complete search history.

(56) References Cited

U.S. PATENT DOCUMENTS

| | | | |
|---|---|---|---|
| 2013/0306156 A1* | 11/2013 | Mueller-Haas | F01N 3/2066 137/1 |
| 2019/0162107 A1* | 5/2019 | Schmitz | F01P 11/0285 |
| 2020/0149463 A1* | 5/2020 | Trythall | B01D 36/001 |

FOREIGN PATENT DOCUMENTS

WO WO-2011162692 A1 * 12/2011 ............... F01N 3/04

* cited by examiner

*Primary Examiner* — Grant Moubry
(74) *Attorney, Agent, or Firm* — Rickard DeMille; Rebecca Henkel; Peter Zacharias

(57) ABSTRACT

Systems and apparatuses include a de-aeration tank for an engine system. The de-aeration tank including a single internal volume defined by walls, a diesel exhaust fluid (DEF) doser port configured to communicate coolant with a DEF doser module, and engine coolant ports configured to communicate coolant with an engine coolant system.

20 Claims, 7 Drawing Sheets

COOLANT SYSTEM FOR AN ENGINE

BACKGROUND

The present disclosure relates generally to engine systems. More specifically, the present disclosure relates to coolant systems for an engine and aftertreatment system.

SUMMARY

One embodiment relates to a de-aeration tank for an engine system. The de-aeration tank includes a single internal volume defined by walls, a diesel exhaust fluid (DEF) doser port configured to communicate coolant with a DEF doser module, and an engine coolant ports configured to communicate coolant with engine coolant system.

Another embodiment relates to a system including an engine; an exhaust gas aftertreatment system receiving exhaust gases from the engine and including a selective catalytic reduction (SCR) system, a diesel exhaust fluid (DEF) tank, and a DEF doser module receiving DEF from the DEF tank and injecting DEF into the SCR system; a de-aeration tank including: a single internal volume defined by walls; a DEF doser port in fluid communication with the DEF doser module; and engine coolant ports in fluid communication with the engine.

Still another embodiment relates to a method including operating an engine, providing diesel exhaust fluid (DEF) to a selective catalytic reduction (SCR) system with a DEF doser module while the engine is operating, providing coolant to the DEF doser module with a coolant pump when the engine is operating, de-aerating coolant from the engine in a de-aeration tank when the engine is operating, de-aerating coolant from the DEF doser module in the de-aeration tank when the engine is operating, and providing a passive flow of coolant to the DEF doser module from the de-aeration tank during engine shutdown.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a driveline of a vehicle includes an engine, an aftertreatment system, and a coolant system. The aftertreatment system of the present disclosure includes a selective catalytic reduction system having a diesel exhaust fluid (DEF) dosing module. The coolant system includes a de-aeration tank connected to the engine and to the DEF dosing module. The de-aeration tank is structured to release entrained air from the coolant and to provide a reverse flow of coolant to the DEF dosing module upon shutdown of the engine.

Overall Vehicle

Figure 1:
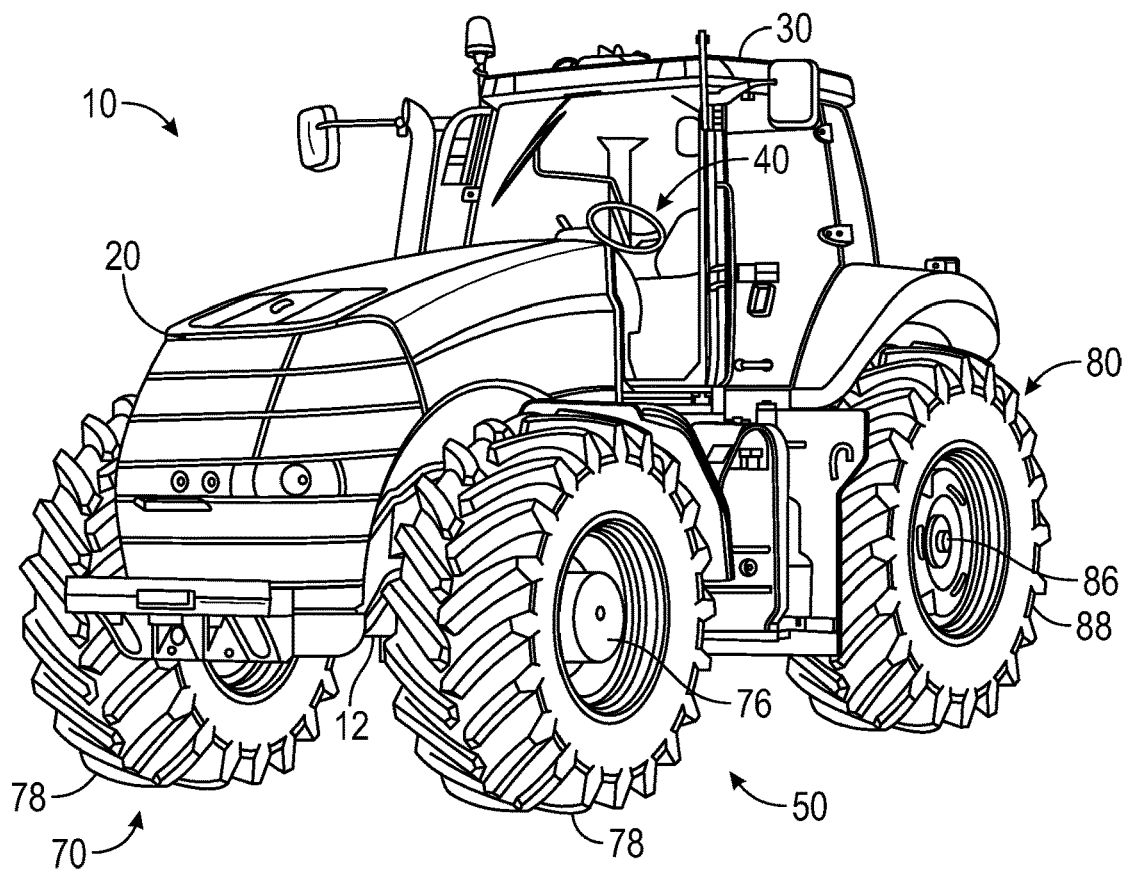
FIG. 1 is a perspective view of a vehicle, according to an exemplary embodiment.
Figure 2:
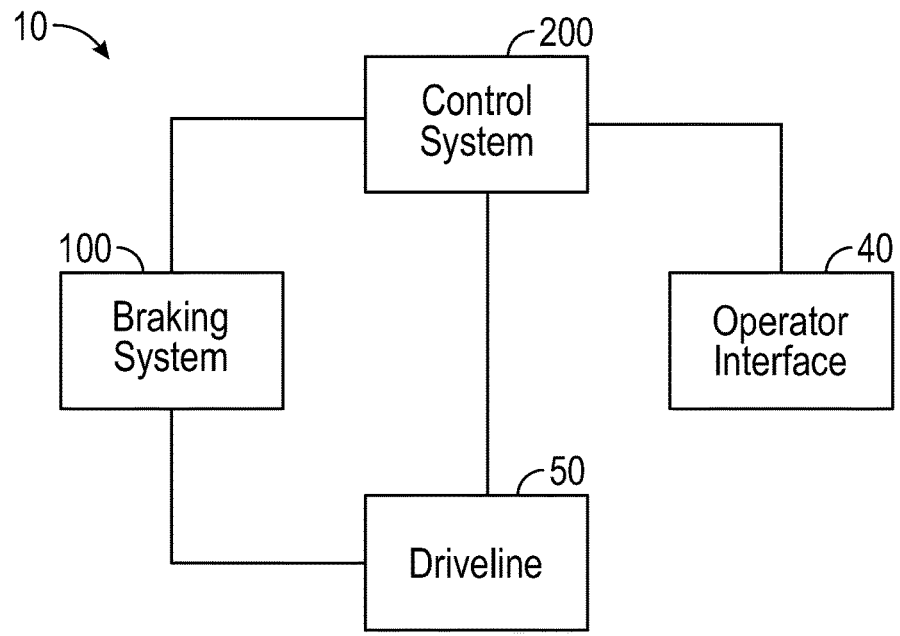
FIG. 2 is a schematic block diagram of the vehicle of FIG. 1, according to an exemplary embodiment.
Figure 3:
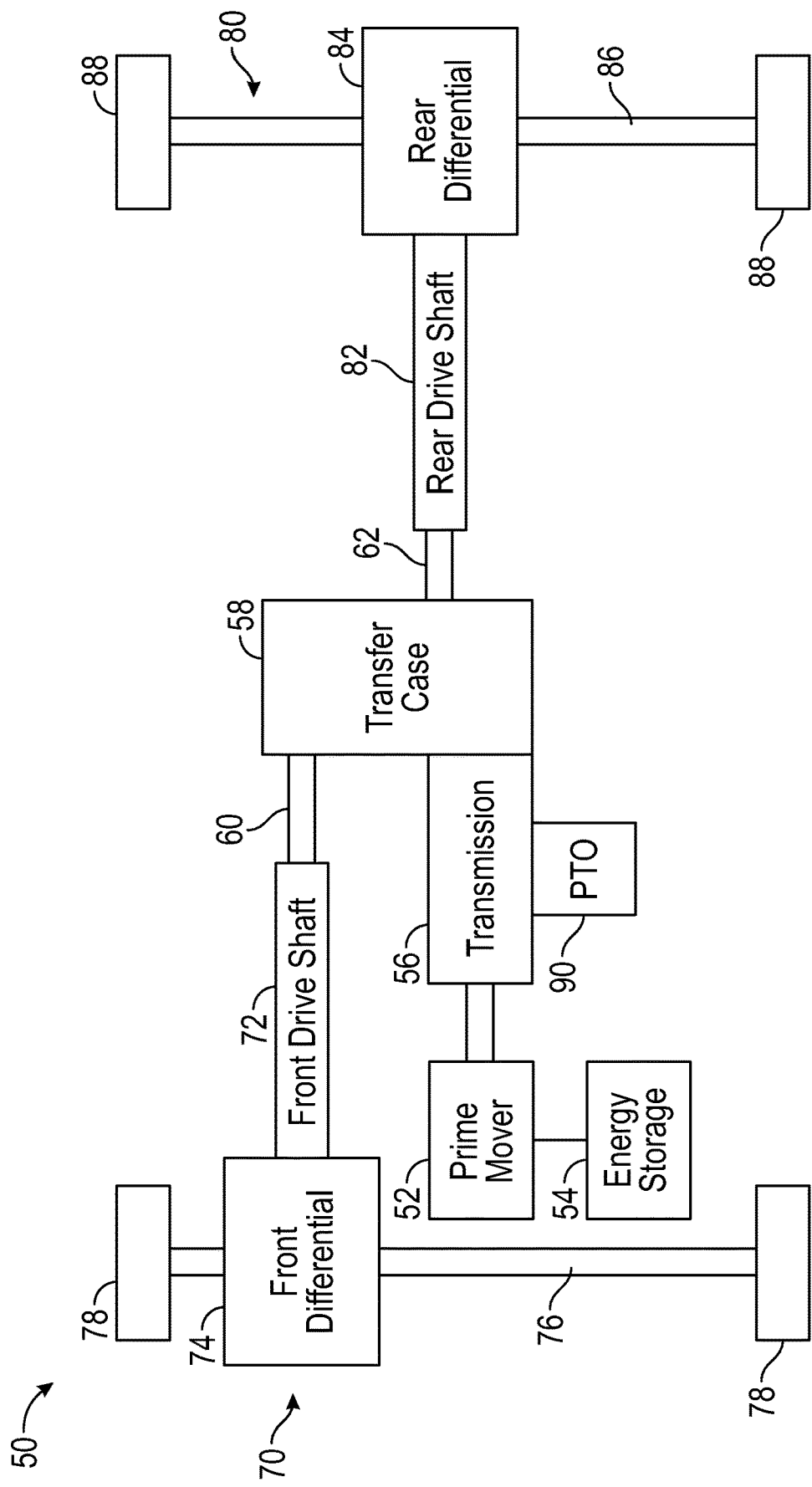
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Driveline Coolant System and Aftertreatment System

Figure 4:
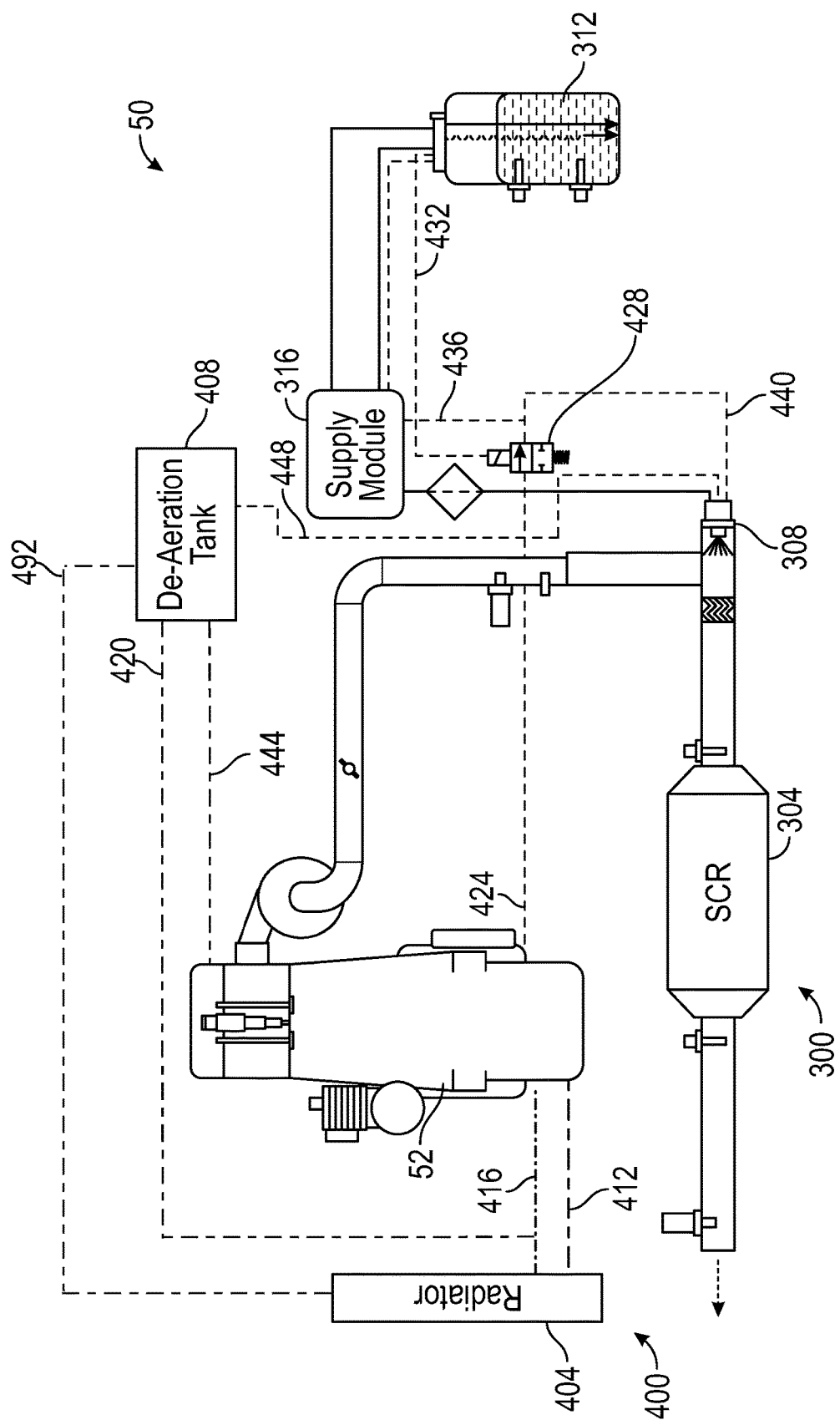
FIG. 4 is a schematic block diagram of a coolant system and an aftertreatment system of the driveline of FIG. 3, according to an exemplary embodiment.

As shown in FIG. 4, the driveline 50 includes the engine 52, an aftertreatment system 300, and a coolant system 400. The aftertreatment system 300 includes an SCR 304 and a DEF dosing module 308 that delivers DEF to the SCR 304. A DEF tank 312 supplies DEF to the DEF dosing module 308 via a supply module 316.

The coolant system 400 includes a radiator 404 and a de-aeration tank 408. The radiator 404 receives coolant from the engine 52 via a radiator supply line 412 and returns coolant to the engine 52 via a radiator return line 416. The radiator return line 416 is also in communication with the de-aeration tank 408 via a de-aeration line 420. The de-aeration line 492 can connect from either the radiator supply line 412 or the inlet tank of the radiator 404 and is shaped to allow entrained air and vaporized coolant medium within the coolant to migrate to the de-aeration tank 408. Coolant that is free from entrained air is returned to the inlet on the engine 52 via de-aeration line 420.

The coolant system 400 also includes a DEF coolant supply line 424 connecting the engine 52 and a DEF coolant valve 428. In some embodiments, the DEF coolant valve 428 is a three-way coolant shut-off valve. In some embodiments, the DEF coolant valve is a spool valve with an electric solenoid and a spring return. The DEF coolant supply line 424 provides coolant from the engine 52 to the DEF coolant valve 428 and selectively to a DEF tank branch supply line 432 for selectively heating DEF held within the DEF tank 312. A DEF tank branch return line 436 returns coolant from the DEF tank 312 to a DEF dosing module supply line 440. Coolant supplied from the DEF dosing module supply line 440 exchanges heat with the DEF dosing module 308 (e.g., via a heat exchanger, internal coolant passages in the dosing module 308, etc.).

Return of coolant to the engine 52 is accomplished by coolant flowing from dosing module 308 to de-aeration tank 408 by line 448. Then the coolant that entered the de-aeration tank 408 via line 448, returns to the engine 52 by de-aeration line 420.

A doser vent line 448 connects the DEF dosing module 308 to the de-aeration tank 408. The doser vent line 448 is shaped and arranged to allow entrained air within the coolant to migrate to the de-aeration tank 408. The coolant return line 448 is also shaped and arranged to allow for coolant flow between the de-aeration tank 408 and the DEF dosing module 308.

The de-aeration tank 408 includes a DEF doser port 445 connected to the coolant return line 448 and an engine coolant return port 446 connected to the de-aeration line 420. The de-aeration tank 408 receives fluid from the engine coolant ports 446 and the vent inlets 464 and provides an expansion volume for coolant within the driveline 50 during operation due to thermal expansion. The de-aeration tank 408 also provides an area for the removal of entrained air from the coolant.

In operation, when the engine 52 is running (i.e., operating, producing power), coolant is provided to the DEF dosing module 308 to manage temperature (e.g., reduce a temperature or limit a temperature of the DEF dosing module 308) by supplying coolant via the DEF coolant supply line 424 and the DEF dosing module supply line 440, and returning coolant via the DEF dosing module return line 448 and the de-aeration line 420. This flow of coolant provides a heat exchange to maintain operation of the DEF dosing module 308 within a desirable temperature range. While the engine 52 is running, entrained air is able to escape the coolant from the main coolant circuit via de-aeration line 444 connected to engine 52 and de-aeration tank 408 as well as from de-aeration line 492 connected to either line 412 or radiator 404 and the de-aeration tank 408. Also, during operation, entrained air in the DEF coolant circuit escapes by vent line 448 connected to dosing module 308 and de-aeration tank 408.

When the engine 52 is shutdown, it is preferable to continue to remove heat from the DEF dosing module 308. However, once the engine 52 is shutdown, no coolant pump is actively running, and therefore coolant is not supplied to the DEF dosing module 308 via the DEF dosing module supply line 440. To provide cooling to the DEF dosing module 308 upon shutdown of the engine 52, the coolant return line 448 is shaped and arranged to provide a reverse flow of coolant to the DEF dosing module 308. In some embodiments, the reverse flow of coolant includes a passive (i.e., not actively pumped) flow of coolant from the de-aeration tank 408 to the DEF dosing module 308 via the coolant return line 448. In some embodiments, the passive reverse flow of coolant is driven by heat exchange within or adjacent the DEF dosing module 308. For example, as the DEF dosing module 308 cools, a thermal contraction of the coolant therein will result and an additional flow of coolant will be provided from the de-aeration tank 408.

Figure 5:
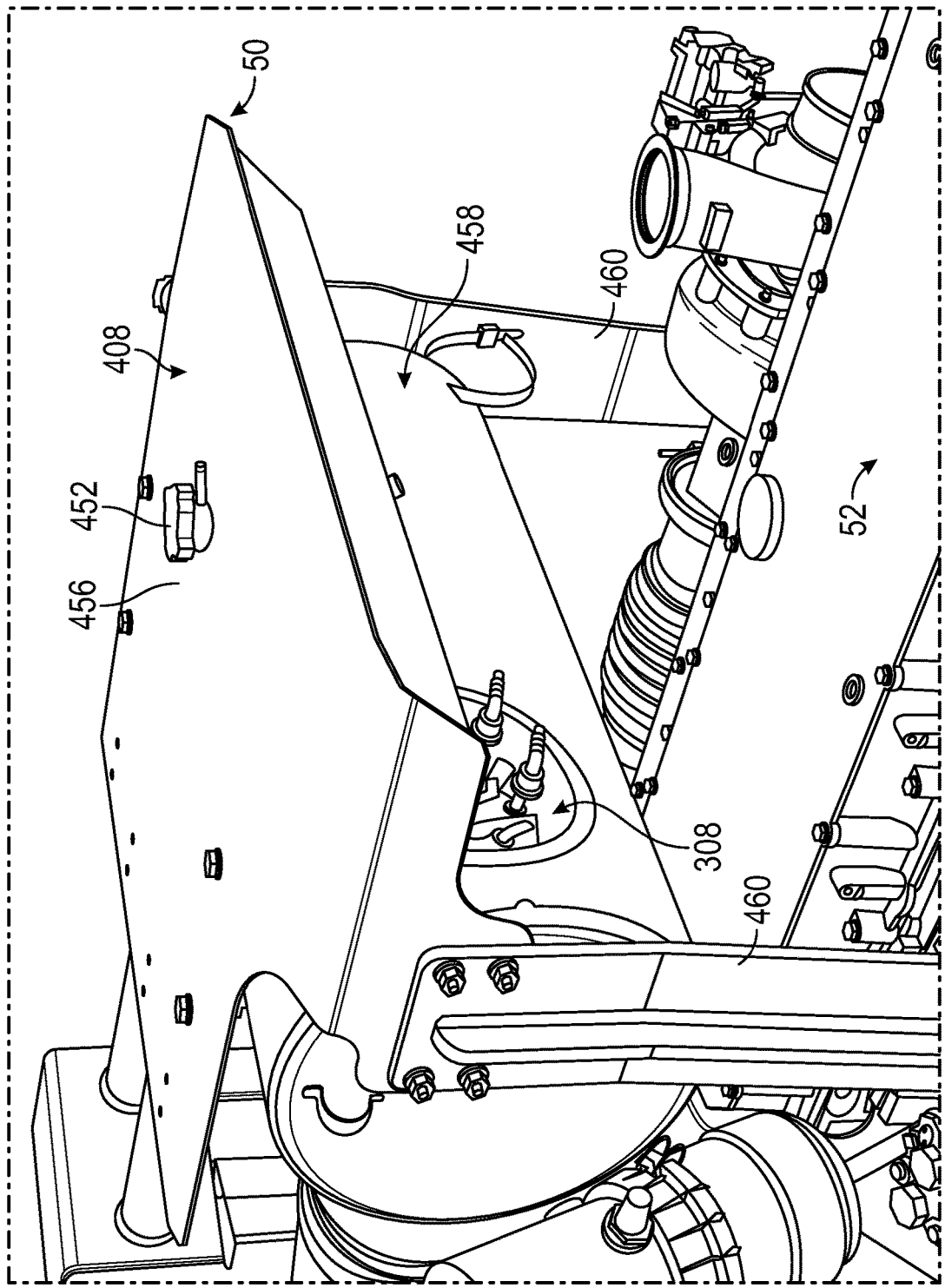
FIG. 5 is a perspective view of the coolant de-aeration or coolant storage system and the aftertreatment system of FIG. 4, according to an exemplary embodiment.

As shown in FIG. 5, the driveline 50 includes the engine 52 and the de-aeration tank 408 arranged vertically above the engine 52. The de-aeration tank 408 includes a vented cap 452. In some embodiments, the de-aeration tank 408 includes a rigid cover 456 that provides physical mounting for engine system components such as a diesel oxidation catalyst 458. For example, the rigid cover 456 may be constructed from a ferrous material (e.g., steel) and provides a mounting for the diesel oxidation catalyst 458 or other more sensitive components of the driveline 50. In some embodiments, the de-aeration tank 408 is supported in position by frame members 460 that also provide physical protection of an engine compartment, the engine 52, the diesel oxidation catalyst 458, or other components of the driveline 50.

Figure 6:
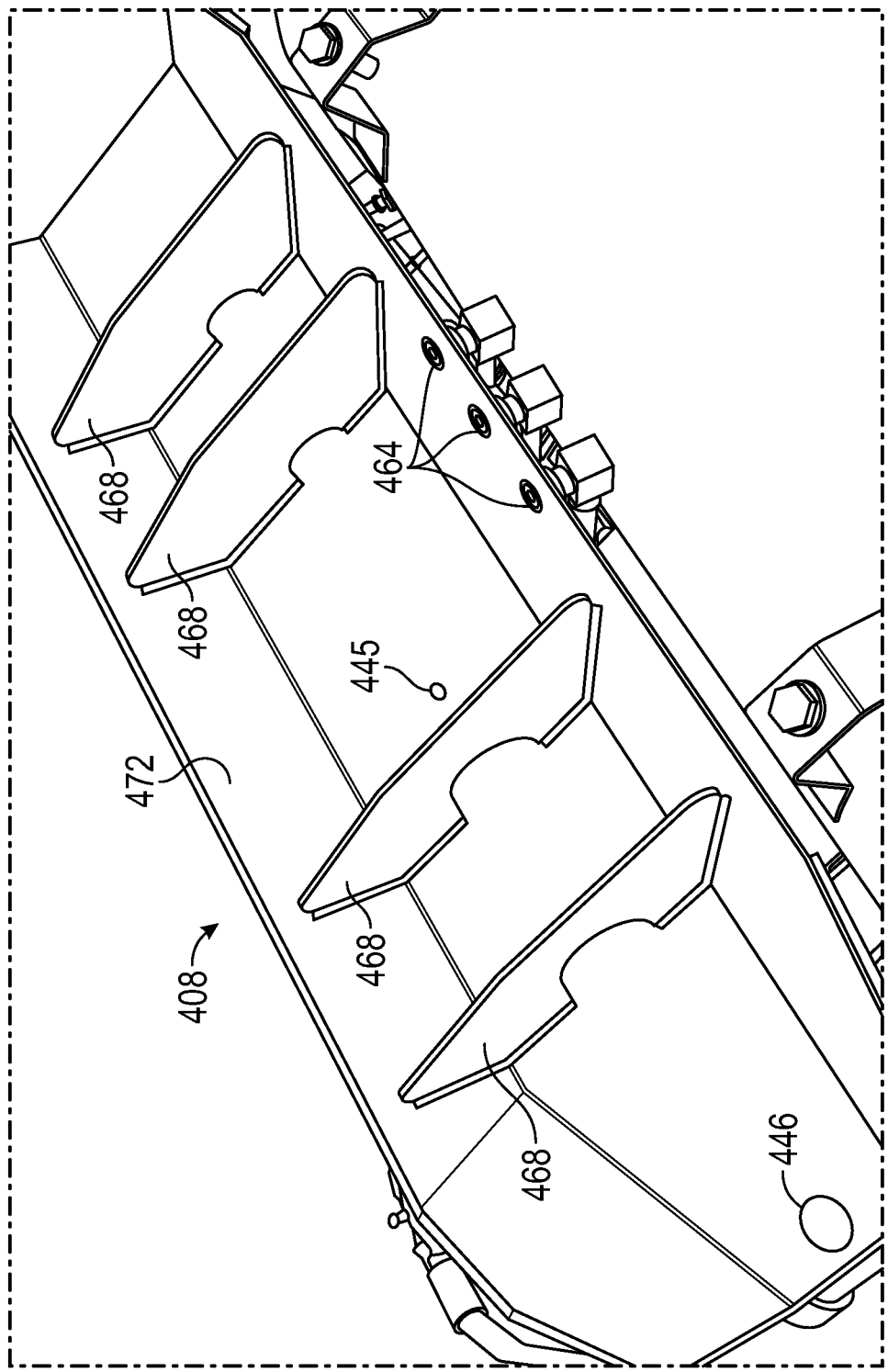
FIG. 6 is a perspective view of a de-aeration tank of the coolant system of FIG. 4, according to an exemplary embodiment.

As shown in FIG. 6, the de-aeration tank 408 includes the DEF doser port 445 and the engine coolant return port 446. The de-aeration tank 408 also includes vent inlets 464 that connect to engine 52 via de-aeration line 444 and the radiator 404 or coolant supply line 412 via de-aeration line 492, and baffles 468 arranged to reduce splashing and reduce uneven fluid flow during use to promote the separation of entrained air from the coolant. The de-aeration tank 408 includes walls that define an internal volume 472. In some embodiments, the internal volume 472 provides about eleven liters (11 L) of volume. In some embodiments, the internal volume 472 provides between about seven liters (7 L) and about fifteen liters (15 L). In some embodiments, the internal volume 472 is greater than about 3 liters (3 L). In some embodiments, the DEF doser port 445 and the engine coolant return port 446 are arranged on opposite sides of at least one baffle 468. For example, two baffles 468 may be positioned between the DEF doser port 445 and the engine coolant return port 446. In some embodiments, more than two, or less than two baffle 468 may be positioned between the DEF doser port 445 and the engine coolant return port 446.

Figure 7:
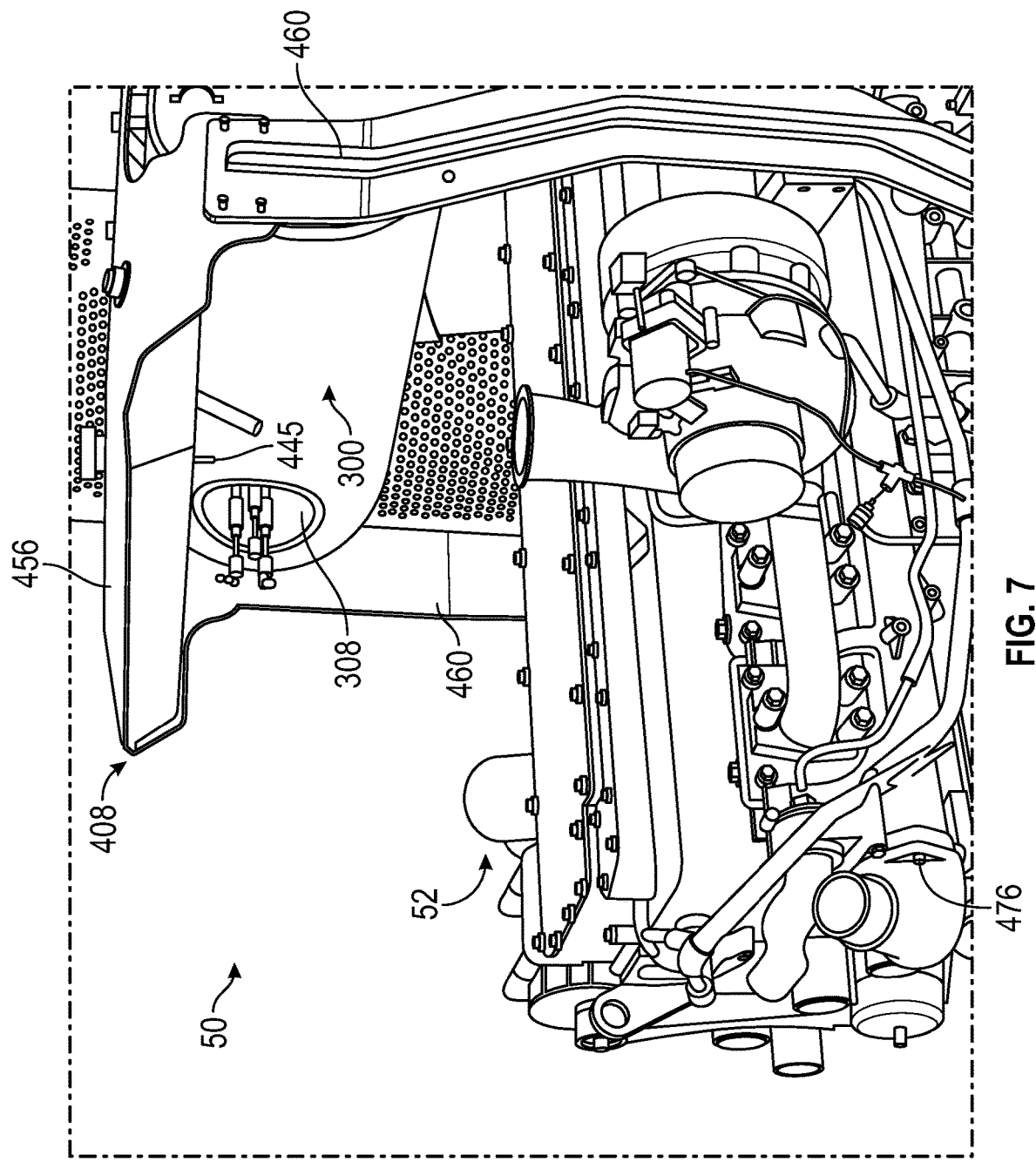
FIG. 7 is a perspective view of the coolant system and the aftertreatment system of FIG. 4, according to an exemplary embodiment.

As shown in FIG. 7, the engine 52 includes a coolant outlet 476 that connects to the DEF coolant supply line 424 for supplying coolant to the DEF dosing module 308. Alternatively, DEF coolant supply line 424 may connect to another high pressure port on the engine 52.

Figure 8:
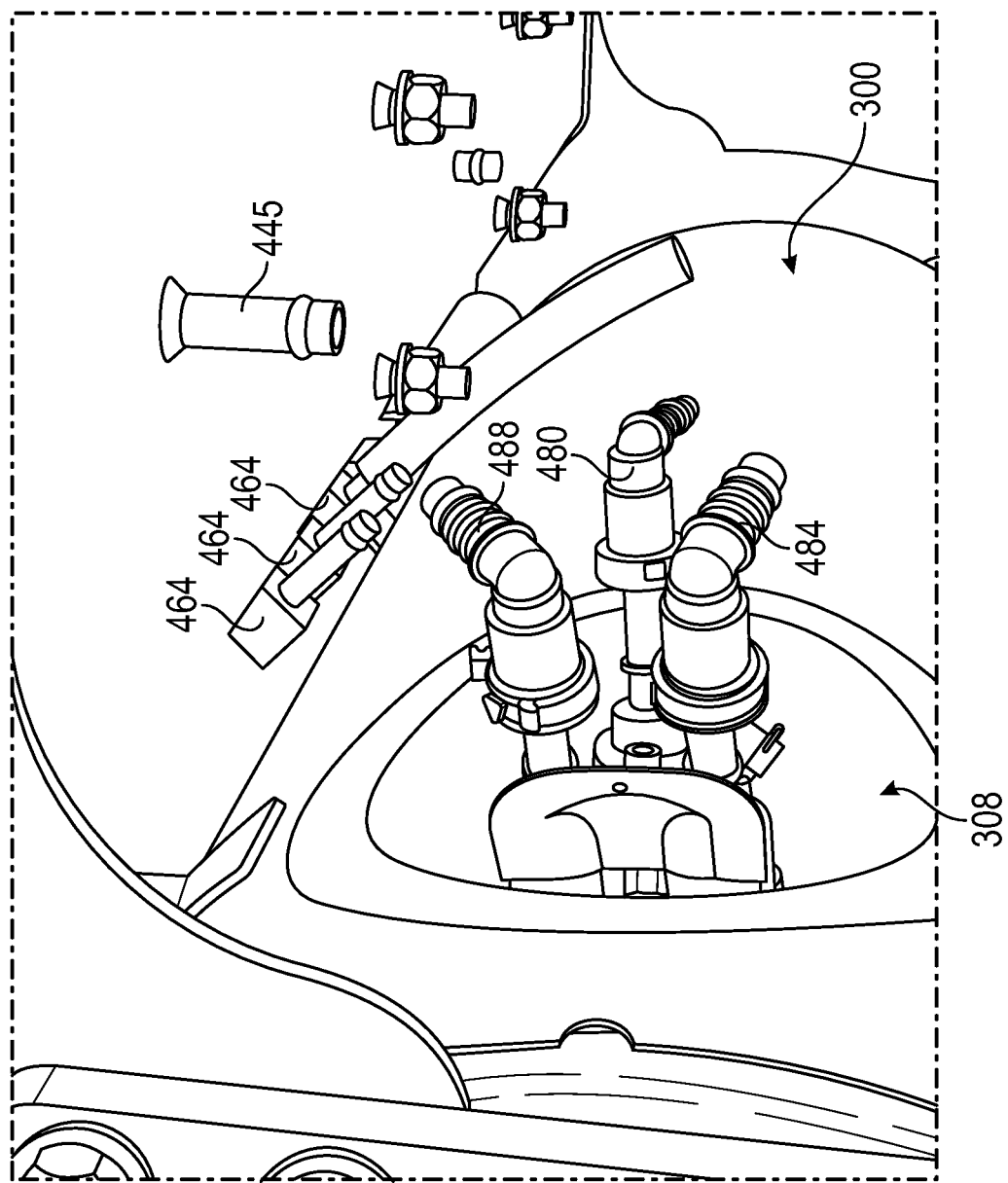
FIG. 8 is a perspective view of the coolant system and the aftertreatment system of FIG. 4, according to an exemplary embodiment.

As shown in FIG. 8, the DEF dosing module 308 includes a DEF inlet 480 connected to the DEF tank 312 for supplying DEF into the exhaust gas stream within the SCR 304. The DEF dosing module 308 also includes a coolant inlet 484 connected to the DEF dosing module supply line 440, and a coolant outlet 488 connected to the coolant return line 448. The coolant outlet 488 and the DEF doser port 445 of the de-aeration tank 408 are arranged to provide unimpeded flow therebetween to allow for the easy passive reverse flow of coolant during shutdown as discussed above.

The coolant system 400 provides a greatly increased volume of coolant available in the de-aeration tank for DEF dosing module 308 cooling compared to typical systems. Additionally, the combination of the DEF dosing module 308 coolant reservoir, and the engine coolant overflow tank of a typical engine improves the ability of the system top operate in a smaller space claim than a typical engine system. The elimination of a separate DEF dosing module coolant reservoir simplifies installation and maintenance of the driveline 50 and increases the volume of coolant available to the DEF dosing module 308.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. A de-aeration tank for an engine system including an engine and an engine coolant system, the engine coolant system including a radiator, a radiator supply line extending from the engine to the radiator, and a radiator return line extending from the radiator to the engine, the de-aeration tank comprising:
   walls defining a single internal volume;
   a diesel exhaust fluid (DEF) doser port configured to fluidly couple with a DEF doser to facilitate a first flow of coolant therebetween;

one or more engine coolant ports configured to fluidly couple with the radiator return line of the engine coolant system to facilitate a second flow of the coolant to the radiator return line; and one or more vent inlets configured to fluidly couple with at least one of (a) the radiator, (b) the radiator supply line, or (c) the engine to facilitate a third flow of entrained air within the coolant into the single internal volume.

2. The de-aeration tank of claim 1, further comprising a baffle positioned within the single internal volume.

3. The de-aeration tank of claim 2, wherein the baffle is positioned between the DEF doser port and the one or more engine coolant ports, and wherein the DEF doser port and the one or more engine coolant ports are position along a bottom wall of the walls.

4. The de-aeration tank of claim 1, wherein the DEF doser port is positioned on a bottom wall of the walls.

5. The de-aeration tank of claim 1, wherein the single internal volume defines a volume between seven liters and fifteen liters, and wherein the de-aeration tank is not a separate component from a coolant overflow tank.

6. The de-aeration tank of claim 1, wherein the DEF doser port is in fluid communication with the engine coolant ports via the single internal volume.

7. A system comprising:
an engine;
an engine coolant system including a radiator, a radiator supply line extending from the engine to the radiator, and a radiator return line extending from the radiator to the engine;
an exhaust gas aftertreatment system receiving exhaust gases from the engine and including a selective catalytic reduction (SCR) system, a diesel exhaust fluid (DEF) tank, and a DEF doser receiving DEF from the DEF tank and injecting the DEF into the SCR system; and
a de-aeration tank fluidly coupled to the engine, the DEF doser, and at least one of the radiator, the radiator supply line, or the radiator return line of the engine coolant system, the de-aeration tank including:
walls defining an internal volume;
one or more ports in fluid communication with the engine coolant system;
a DEF doser port in fluid communication with the DEF doser; and
an engine de-aeration port in fluid communication with the engine.

8. The system of claim 7, wherein the de-aeration tank includes a rigid cover, and wherein a component of the exhaust after treatment system is mounted to the rigid cover.

9. The system of claim 7, wherein when the engine is running, coolant flows from the DEF doser to the de-aeration tank via the DEF doser port, and wherein when the engine is shut down, coolant flows from the de-aeration tank via the DEF doser port to the DEF doser.

10. The system of claim 7, further comprising frame members extending vertically upward on opposing sides of the engine such that the de-aeration tank is positioned vertically above the engine and the DEF doser.

11. The system of claim 7, wherein the de-aeration tank includes a baffle positioned within the internal volume.

12. The system of claim 11, wherein the baffle is positioned between the DEF doser port and at least one of the one or more ports.

13. The system of claim 7, further comprising a valve positioned between (a) the engine and (b) the DEF tank and the DEF doser, and wherein the valve is configured to selectively divert coolant received from the engine to the DEF tank or the DEF doser.

14. The system of claim 7, wherein the one or more ports include at least one of (a) a coolant return port fluidly coupled to the radiator return line or (b) a coolant system de-aeration port fluidly coupled to at least one of (i) the radiator or (ii) the radiator supply line.

15. The system of claim 14, wherein the one or more ports include (a) the coolant return port and (b) the de-aeration port.

16. The system of claim 15, wherein the de-aeration port is fluidly coupled to the radiator.

17. The system of claim 15, wherein the de-aeration port is fluidly coupled to the radiator supply line.

18. The system of claim 14, wherein the one or more ports include the coolant return port, and wherein the coolant return port and the DEF doser port are positioned along a bottom wall of the de-aeration tank.

19. The system of claim 18, wherein the de-aeration tank includes a baffle positioned between the coolant return port and the DEF doser port.

20. The system of claim 7, wherein the system does not include a coolant overflow tank such that the de-aeration tank is not separate from such a coolant overflow tank.

* * * * *